United States Patent [19]
Finley

[11] Patent Number: 6,101,758
[45] Date of Patent: Aug. 15, 2000

[54] CRANK BAIT LURE WITH IMPROVED DEPTH ADJUST MECHANISM

[76] Inventor: Kevin J. Finley, 17106 N. Catherine Ct., Surprise, Ariz. 85374

[21] Appl. No.: 09/240,445

[22] Filed: Jan. 29, 1999

[51] Int. Cl.$^7$ .................................................. A01K 85/00
[52] U.S. Cl. ............................................................ 43/42.22
[58] Field of Search ................................ 43/42.22, 42.47

[56] References Cited

U.S. PATENT DOCUMENTS

| | | | |
|---|---|---|---|
| 1,266,311 | 5/1918 | Phinney | 43/42.22 |
| 2,495,134 | 1/1950 | Roberts | 43/42.22 |
| 2,611,207 | 9/1952 | Pond | 43/42.22 |
| 2,615,274 | 10/1952 | Slough | 43/42.22 |
| 2,618,096 | 11/1952 | Wagner | 43/42.22 |
| 2,723,483 | 11/1955 | Jepson | 43/42.22 |
| 2,776,517 | 1/1957 | Borgstrom | 43/42.22 |
| 2,904,921 | 9/1959 | Purgason | 43/42.22 |
| 2,983,065 | 5/1961 | Ferguson et al. | 43/42.22 |
| 3,815,275 | 6/1974 | Amundson | 43/42.22 |
| 4,141,171 | 2/1979 | Muddiman | 43/42.47 |
| 4,215,507 | 8/1980 | Russell | 43/42.22 |
| 5,329,721 | 7/1994 | Smith | 43/42.22 |

*Primary Examiner*—Thomas Price
*Attorney, Agent, or Firm*—Skarsten Law Offices S.C.

[57] ABSTRACT

A crank bait lure is provided which can be adjusted to travel to a number of different depths, to cover a range including shallow, intermediate and comparatively deep levels of operation. The lure comprises an elongated body provided with a groove extending into its interior, and further comprises a lip member having a first portion which is receivable into the groove, and a second portion which extends out of the lure body, beyond the forward end thereof. The lip member is slidable along the groove to selectively vary the length of the extending portion, such length being related to the depth of operation of the crank bait lure. The lure further comprises a detent mechanism for releasably locking the lip member at one of a plurality of discrete positions, in order to adjust the extending portion thereof to the length required for the lure to operate at a particular depth. The detent mechanism includes a spring and a locking element operated thereby, both of such components being protectively housed within the body of the lure.

12 Claims, 2 Drawing Sheets

CRANK BAIT LURE WITH IMPROVED DEPTH ADJUST MECHANISM

BACKGROUND OF THE INVENTION

The invention disclosed and claimed herein generally pertains to a crank bait fishing lure which may be readily set or adjusted to operate at a number of different depth levels. More particularly, the invention pertains to a crank bait lure having a depth adjustment mechanism, wherein principal components thereof are protectably housed or contained within the interior of the lure. Even more particularly, the invention pertains to a crank bait lure of the above type which is comparatively simple and inexpensive to manufacture.

As is well known by those of skill in the art, a crank bait fishing lure is a type of artificial lure which is cast or otherwise placed into a body of water containing game fish. A line attached to the lure is then wound upon a reel or the like, by turning or cranking the reel, so that the lure is drawn through the water. In such arrangements, it is very common to attach the line to the forward end, or nose of the lure, and also to provide a member, variously referred to as a lip, a spoon, or a bill, which extends in front of the nose. As the lure is being drawn through the water, the combination of forces applied to the lure, by the line and by the lip member acting against the water, causes the lure to dive. The angle at which the lure dives, or diving angle, is determined by the shape and length of the extending lip member.

It has long been recognized that there are significant advantages in mounting the lip or bill so that the length of the lip portion extending in front of the lure can be selectively changed or adjusted. Generally, increasing the length of such extending portion increases diving angle, so that the lure travels to a greater depth as it moves through the water. Conversely, reducing the length of the extending lip portion reduces diving angle, so that the lure remains closer to the surface as it moves. Thus, a single lure may be configured to operate at different levels, to accommodate different conditions and to be used for different types of fish.

U.S. Pat. No. 4,215,507, issued Aug. 5, 1980 to Russell, exemplifies a class of fishing lures which are provided with an adjustable bill member or the like. As shown thereby, it is conventional practice to secure the adjustable member in place, with respect to the lure body, by means of a screw or the like. However, while a screw may be effective initially for such purpose, over time and after repeated use, the threads in the lure body engaged by the screw may tend to wear. As this occurs, it becomes increasingly difficult for the screw to provide sufficient holding force to prevent slippage of the bill member. As a result, the diving angle, and therefore the depth reached by the lure, could change unexpectedly and at an inopportune time, such as just after the lure has been cast. Moreover, wear of the lure body threads may be accelerated if plastics or other new materials are substituted for wood, which has previously been the material of choice for fishing lures.

The arrangement shown by the Russell patent illustrates a further disadvantage in certain lures of the prior art. As is well known, a fishing lure can be subjected to substantial stresses, such as when a fish takes a lure hook or the lure becomes snagged on underwater debris. In the arrangement of Russell, the line attachment point is mounted on the adjustable bill. Accordingly, most of the stresses applied to the lure, by action of the attached line and hooks, are directed right through the the bill member retention screw, and through the threads engaged thereby. Such stresses will tend to hasten the wear of the threads, further degrading the holding power of the retention screw.

SUMMARY OF THE INVENTION

The invention is directed to a crank bait lure or like apparatus, which may travel to and operate at a number of different depth levels. The crank bait lure comprises an elongated lure body provided with a groove extending into its interior, and further comprises a lip member having a first portion which is receivable into the groove, and a second portion which extends out of the lure body beyond the forward end thereof. The lip member is slidable along the groove to selectively vary the length of the second portion, such length being related to the operating depth of the crank bait lure. A detent mechanism enclosed within the lure body is provided to selectively lock the lip member at one of a plurality of discrete positions, relative to the lure body, and to thereby adjust the second portion of the lip member to the length required to operate the lure at a selected depth level.

In a preferred embodiment of the invention, the detent mechanism comprises a locking element which is insertable into a complementary recess formed in the lip member, to lock the lip member at one of the discrete positions. The detent mechanism further comprises a spring disposed to urge the locking element into the complementary recess. A pin extends into the lure body for applying a force to the locking element, in opposition to the force provided by the spring, to urge the locking element out of the complementary recess, and thereby release the lip member for adjustment to a different position. Preferably, a plurality of recesses are formed along the lip member in spaced-apart relationship, each recess being associated with a different depth of crank bait lure operation.

Preferably also, a line attachment element, such as a line tying eye, is joined to the front of the lure body in spaced-apart relationship. Usefully, means are provided for transmitting a force between the line attachment element and a hook attachment element, also joined to the lure body, while at the same time preventing such force from affecting operation of the detent mechanism.

OBJECTS OF THE INVENTION

An object of the invention is to provide a crank bait lure which may be readily set to operate at different depths, over a comparatively wide range.

Another object is to provide a lure of the above type having a lip member or portion thereof which extends in front of the lure, the length of the extending portion being adjustable to set the lure for operation at a specified depth.

Another object is to provide a lure of the above type having an improved detent mechanism for rigidly locking the lip member in position, after adjusting the extending portion thereof to a desired length.

Another object is to provide a lure of the above type, wherein principal components of the detent mechanism are contained within the interior of the lure body and protected thereby.

Another object is to prevent forces applied to the lure, such as may occur when a fish strikes the lure, from damaging or otherwise affecting operation of the detent mechanism.

Another object is to provide an apparatus of the above type which is comparatively simple and inexpensive to manufacture.

These and other objects and advantages of the invention will become more readily apparent from the following description, taken together with the accompanying drawings.

DETAILED DESCRIPTION OF THE PREFERRED EMBODIMENT

Figure 1:
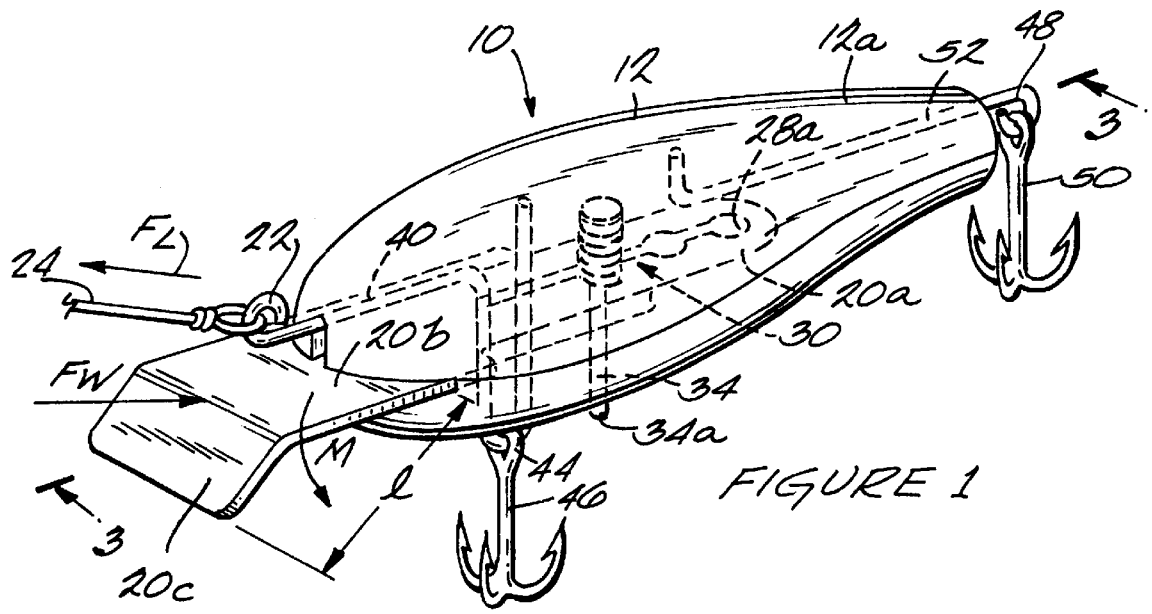
FIG. 1 is a perspective view showing an embodiment of the invention.
Figure 3:
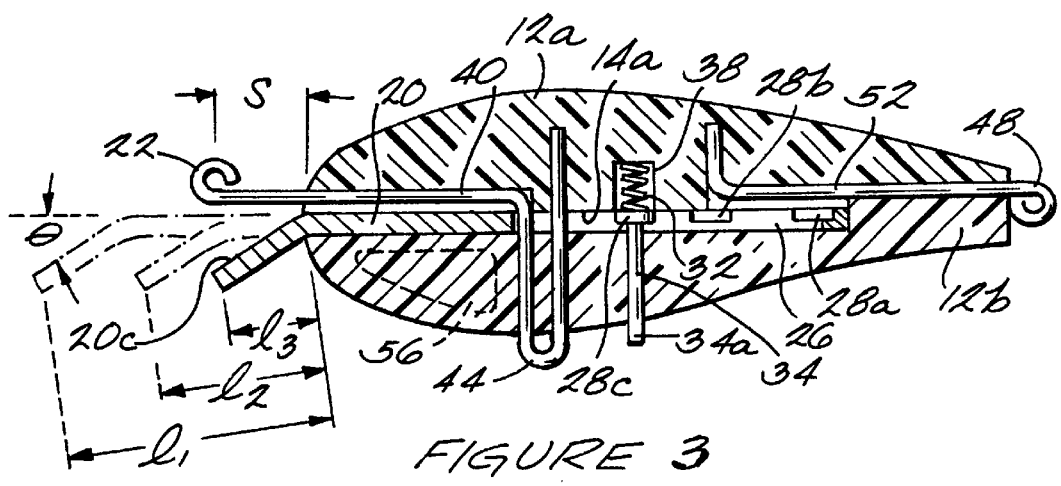
FIG. 3 shows a longitudinal section taken along lines 3—3 of FIG. 1.
Figure 2:
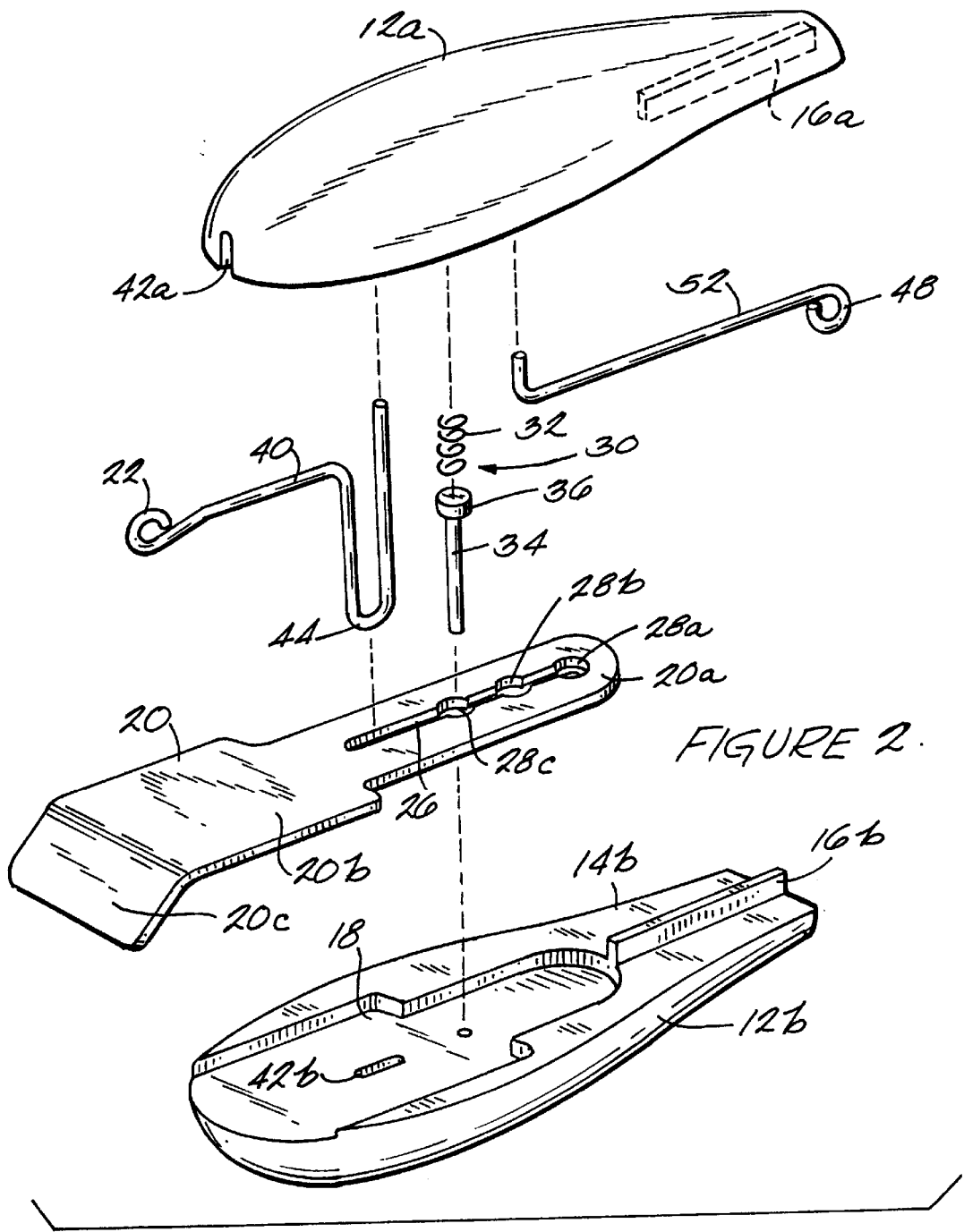
FIG. 2 is an exploded perspective view of the embodiment shown in FIG. 1.

Referring to FIGS. 1 and 2 together, there is shown an adjustable depth crank bait lure 10 constructed in accordance with principles of the invention. Lure 10 includes a lure body 12, which usefully comprises upper and lower body components 12a and 12b, respectively. To form lure body 12, a surface 14b of lower component 12b is bonded, by means of a suitable adhesive or the like, to a matching surface 14a of upper body component 12a (as best shown in FIG. 3). In order to ensure that the two body components are properly aligned, lower body component 12b is provided with a tab or tongue 16b, which is disposed for insertion into a complementary slot 16a formed in upper body component 12a. The tab and slot arrangement also serves to resist stresses applied along the joint between the two body components, to prevent the bond therebetween from being ruptured or broken. Preferably, both upper and lower body components are formed of molded plastic, such as a type known in the art as ABS. Preferably also, each component is hollow and encloses a pocket of air, in order to provide a specified buoyancy. However, in other embodiments of the invention one or both body components could be solid, and could be formed of wood or other material.

When lure body components 12a and 12b are joined together as described above, a groove 18 is formed therebetween which extends into the interior of lure body 12. Groove 18 is open at the forward end or nose of lure body 12, and is generally oriented in parallel relationship with a longitudinal axis extending along the lure body. Groove 18 is dimensioned to receive a portion 20a of a lip or lip member 20. The remainder of the lip member, designated in FIG. 1 as lip portion 20b, extends out of groove 18, in front of the nose of the lure body, to a length l. It is to be understood that lip member 20 may be slidably moved along groove 18. Thus, the lip member 20 may be selectively extended out from or retracted into lure body 12, to respectively increase or decrease the lip portion 20b and the length l thereof.

As best shown by FIG. 1, lure 10 is provided with a line attachment point 22, described hereinafter in further detail, which is slightly spaced above the extending lip portion 20b. There is further shown a line 24 tied to attachment point 22. In use, a fisherman casts or otherwise places lure 10 into a body of water. He then applies a force $F_L$ to the line 24, such as by winding or cranking a reel, to draw the lure 10 through the water. As the lure moves, the water applies a force $F_W$ to extending lip portion 20b, so that a moment M is applied to the moving lure. The moment M rotates the lure downwardly as viewed in FIG. 1, causing the lure to dive. The diving angle of the lure, and therefore the depth to which it travels when moving at a given velocity, is directly determined by the force $F_W$. This force, in turn, is determined by the dimensions of extending lip portion 20b. Thus, by selectively sliding lip 20 along groove 18, lure 10 can be provided with any diving angle, and can therefore travel to any desired depth, over a comparatively wide range.

In accordance with the invention, it has been recognized that for most applications the lip member 20 needs to be adjustable to only a limited number of positions, relative to the lure body 12. For example, for the embodiment shown in FIGS. 1–3, lip member 20 can be adjusted to three discrete positions, although the invention is by no means limited thereto. Thus, referring to FIG. 3, there is shown lip member 20 adjustable so that extending lip portion 20b thereof will have one of the lengths $l_1$–$l_3$. When lip member 20 is set to provide the greatest length $l_1$, lure 10 will have a steep diving angle, and accordingly, will travel to a comparatively deep level. On the other hand, when member 20 is set to provide the smallest length $l_3$, lure 10 will have a shallow diving angle and will operate close to the surface of the water. An adjustment to the length $l_2$ will cause the lure to operate at an intermediate depth.

As best shown by FIG. 2, a slot 26 is formed in the rearward portion of lip member 20, the rearward portion being of reduced width in comparison with the forward portion thereof. Circular recesses 28a–28c are also formed in the rearward portion of the lip member, in spaced apart relationship with one another along the slot 26. Each of the recesses is provided for selective engagement by a detent mechanism 30, as described hereinafter in further detail, and is positioned so that its center lies along the centerline of slot 26.

Detent mechanism 30 comprises a spring 32 and a locking element 36, which usefully is a disk-shaped member mounted upon a pin 34, for movement in unison therewith. Pin 34 extends downwardly through slot 26, and also through a hole formed through lower body component 12b, as best viewed in FIG. 3. The end of pin 34 which is opposite from locking element 36, comprising an end portion 34a, extends below body component 12b by a specified amount. The diameter of pin 34 is slightly less than the width of slot 26. Accordingly, pin 34 does not impede or interfere with sliding movements of lip member 20 along the groove 18.

FIG. 3 further shows a well or recess 38, of circular cross-section, which is formed in upper body component 12a. Well 38 is positioned directly above pin 34 and locking element 36, and is sized to receive the spring 32. When spring 32 is located in well 38, it acts against locking element 36, to urge the locking element downwardly. Locking element 36 is dimensioned to fit into each of the circular recesses 28a–28c. Thus, if one of the recesses is aligned with the locking element 36, the locking element will be urged into the aligned recess by the action of spring 32. The lip member 20 will thereby be locked into a fixed position with respect to lure body 12. In a useful arrangement, recess 28a is positioned so that when locking element 36 is aligned therewith and inserted thereinto, lip member 20 is locked into a setting such that lip portion 20b is extended to the length $l_1$. As stated above, such setting causes lure 10 to operate at its deepest level. In similar manner, when locking element 36 is aligned with and inserted into recesses 28b and 28c, lip member 20 is set to its position for intermediate and shallow levels of operation, respectively.

In order to change the setting of lip member 20, lower end portion 34a of pin 34 is pressed into the lure body 12, so that pin 34 moves the locking element 36 upwardly with respect to lip member 20, and also compresses spring 32. When the locking element is lifted above lip member 20, the lip member may be freely moved rightward or leftward, as viewed in FIG. 3, to align a different one of the recesses 28a–c, corresponding to the desired new setting, with locking element 36. The pin 34 is then released, whereupon spring 32 acts to urge locking element 36 into the newly aligned recess.

In the above arrangement for releasably locking lip member 20, it will be seen that the components of detent mechanism 30, as well as pin 34 except for its end portion 34a, are protectively enclosed or housed within lure body 12.

Referring further to FIGS. 1–3, there is shown a length of selectively shaped heavy gauge stainless steel wire 40, which is disposed for insertion into slots 42a and 42b formed in lure body components 12a and 12b, respectively. The wire 40 is securely held in place between the two body components, when they are joined together. As shown in particular by FIG. 1, wire 40 extends through slot 26 of lip member 20, so that it does not interfere with movement thereof. Line attachment point 22, referred to above, comprises an eyelet formed in an end of wire 40 which extends out from the nose of lure body 12, by a spacing s, and which is positioned directly above the lip member 20. Spacing s is selected so that when the lure 10 is being reeled or cranked in, the force $F_L$, applied by line 24 at the attachment point 22, acts together with forces provided by lip member 20 to cause the lure to swim, i.e., to rapidly wriggle back and forth. This motion is very important, in order to cause a game fish to believe that the lure is a live fish. Spacing s may, for example, comprise on the order of 0.25–0.50 inches.

A bend or loop 44 formed in wire 40, which extends through the bottom of lure body 12, provides an eyelet or attachment point for a hook 46. A second eyelet 48 for a hook 50, located at the rear of the lure body, is provided by selectively shaping a second length of wire 52, which is likewise secured between the upper and lower body components. It will be readily apparent that when one of the hooks becomes engaged, such as by a fish or by underwater debris, the lure 10 will be subjected to substantial stress, as the hook applies a force to the lure in one direction and the line 24 applies a force thereto in an opposing direction. An essential feature of the invention is that none of these stresses are applied either to lip member 20 or to detent mechanism 30. This is achieved by employing the shaped wires 40 and 52 as force transmission paths between line attachment point 22 and the hook attachment points 48 and 52, respectively. At the same time, wires 40 and 52 are respectively positioned within lure body 12 so that forces transmitted therealong avoid the lip member 20 and the detent mechanism 30. Accordingly, it is not likely that these forces will damage the detent mechanism, or cause the lip member to move from an intended setting.

Figure 4:
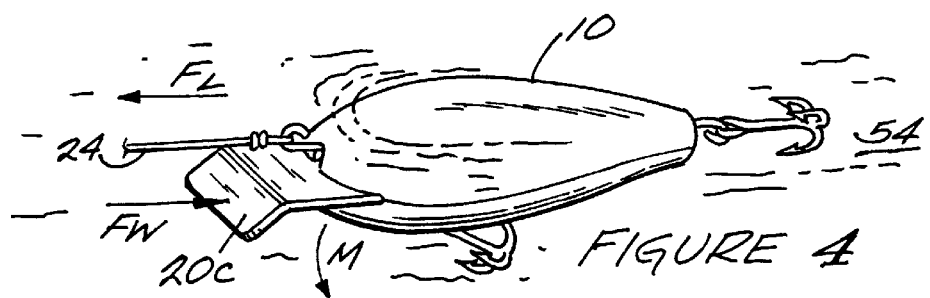
FIG. 4 is a schematic representation illustrating an additional feature of the embodiment shown in FIG. 1.

As viewed in FIG. 3, the forward end 20c of lip member 20 is bent downwardly, with respect to the remainder thereof, by an angle θ. Usefully, θ is on the order of 30°. Benefits of providing such feature are illustrated by FIG. 4. As shown therein, when lure 10 is in a body of water 54, prior to application of force $F_L$ by line 24, it may lie in a horizontal orientation. Initially, when the line 24 starts to pull the lure, the force of the water $F_W$ would also be directed in a horizontal direction. In the absence of the bent forward end 20c, this force would be parallel to all parts of the lip member. Accordingly, such force would be of little effect in rotating the lip member downwardly, until the lure become oriented downward as a result of wave action or other motion. However, by providing lip member 20 with the downwardly bent end 20c, the force $F_W$ immediately acts against end 20c, as shown by FIG. 4, to apply a rotating moment M to the lure as described above. Such action commences as soon as the lure starts moving through the water, even when the lure is in a horizontal orientation.

Referring further to FIG. 3, there is shown an amount of lead or other weighting material 56 placed in the lower front portion of lure body 12, to assist the diving action of lure 10.

Obviously, other modifications and variations of the present invention are possible in light of the above teachings. It is therefore to be understood that within the scope of the disclosed concept, the invention may be practiced otherwise than as specifically described.

What is claimed is:

1. Crank bait lure apparatus disposed for operation at a plurality of different selected depths, said lure apparatus comprising:

an elongated body provided with a groove extending into its interior, and further provided with a forward end;

a lip member having a first portion which is receivable into said groove, and a second portion which extends out of said lure body beyond said forward end, said lip member being slidable along said groove to selectively vary the length of said second portion, said length being related to the operating depth of said lure apparatus; and a detent mechanism enclosed within said lure body, said detent mechanism comprising a locking element insertable into a complementary recess formed in said lip member to selectively lock said lip member at one of a plurality of discrete positions relative to said lure body, and to thereby adjust said second portion to the length required for said lure apparatus to operate at one of said selected depths, said detent mechanism further comprising means for urging said locking member into said recess.

2. The lure apparatus of claim 1 wherein:

said urging means comprises a spring disposed to urge said locking member into said recess.

3. The lure apparatus of claim 2 wherein:

said apparatus further comprises a pin extending into the interior of said lure body for applying a force to said locking element, in opposition to the force provided by said spring, to urge said locking element out of said complementary recess.

4. The lure apparatus of claim 3 wherein:

said lip member is provided with a plurality of said complementary recesses positioned in spaced apart relationship with one another, each of said recesses being associated with one of said discrete positions of said lip member.

5. The lure apparatus of claim 4 wherein:

a slot is formed through said first portion of said lip member, said slot being oriented along the direction of travel of said lip member with respect to said groove; and said complementary recesses are respectively aligned along said slot.

6. The lure apparatus of claim 5 wherein:

said pin is positioned to extend through said slot.

7. The lure apparatus of claim 3 wherein:

said lip member comprises a flat member having a forward end bent to lie at a specified angle with respect to the remainder of said lip member; and said groove is oriented in substantially parallel relationship with the longitudinal axis of said lure body.

8. The lure apparatus of claim 7 wherein:

said forward end of said lip member is bent downwardly with respect to said lure body; and said specified angle is on the order of 30° degrees.

9. The lure apparatus of claim 3 wherein:

said lure body comprises first and second components fixably joined together to enclose said locking element and said spring.

10. The lure apparatus of claim 1 further comprising:

a line attachment element; and an elongated member fixably joining said line attachment element to said lure body, in selectively spaced apart relationship with said forward end thereof, and also in spaced apart relationship with said second portion of said lip member.

11. The lure apparatus of claim 10 further comprising:

a hook attachment element; and means for transmitting a force between said line and hook attachment elements, while preventing application of said force to respective components of said detent mechanism.

12. The lure apparatus of claim 11 wherein:

said force transmitting means comprises a selectively shaped wire element extending through a slot formed through said first portion of said lip member.

* * * * *